E. P. KENDALL.
POTATO HARVESTER.
APPLICATION FILED SEPT. 27, 1912.
1,199,704.
Patented Sept. 26, 1916.
6 SHEETS—SHEET 1.
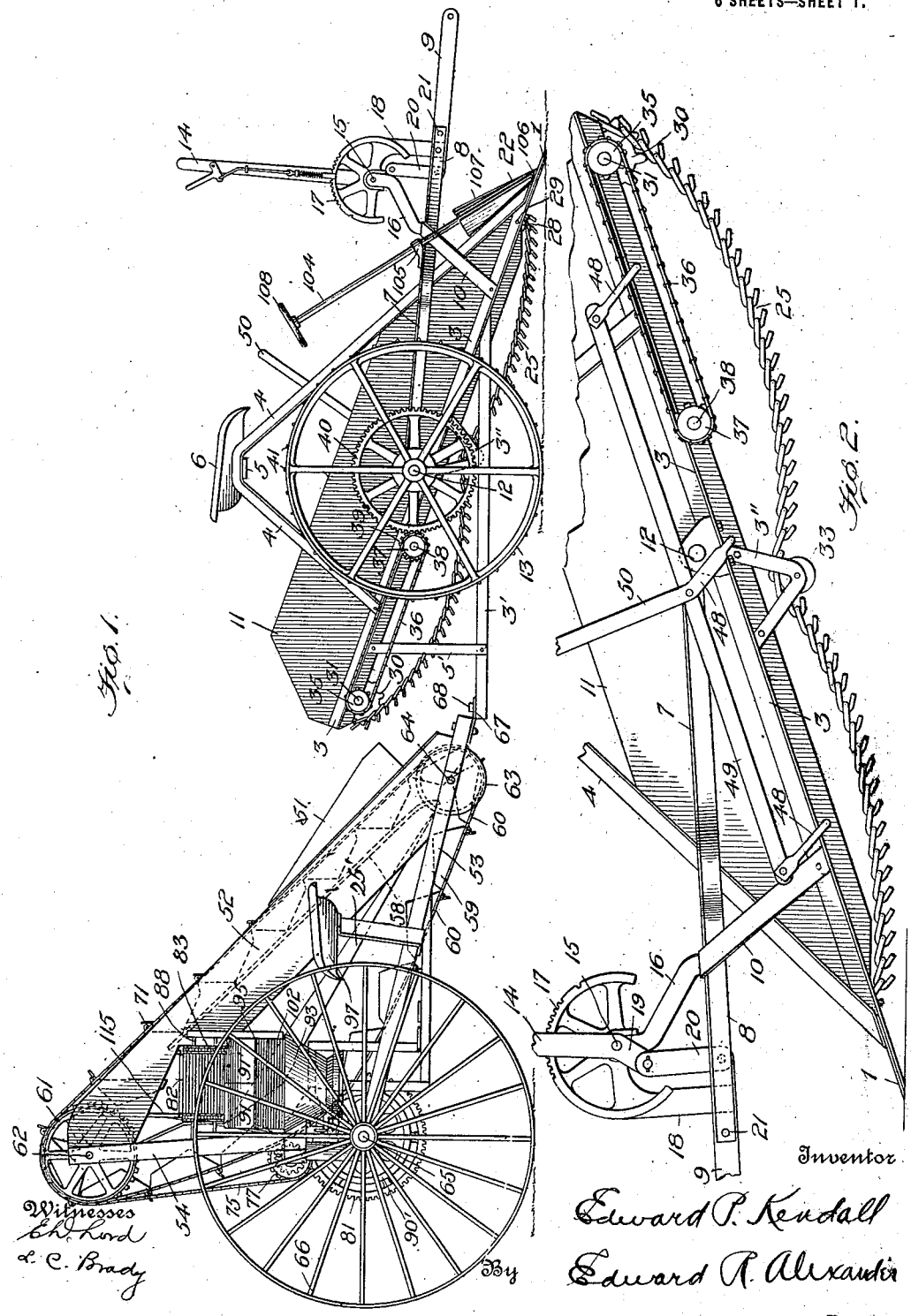

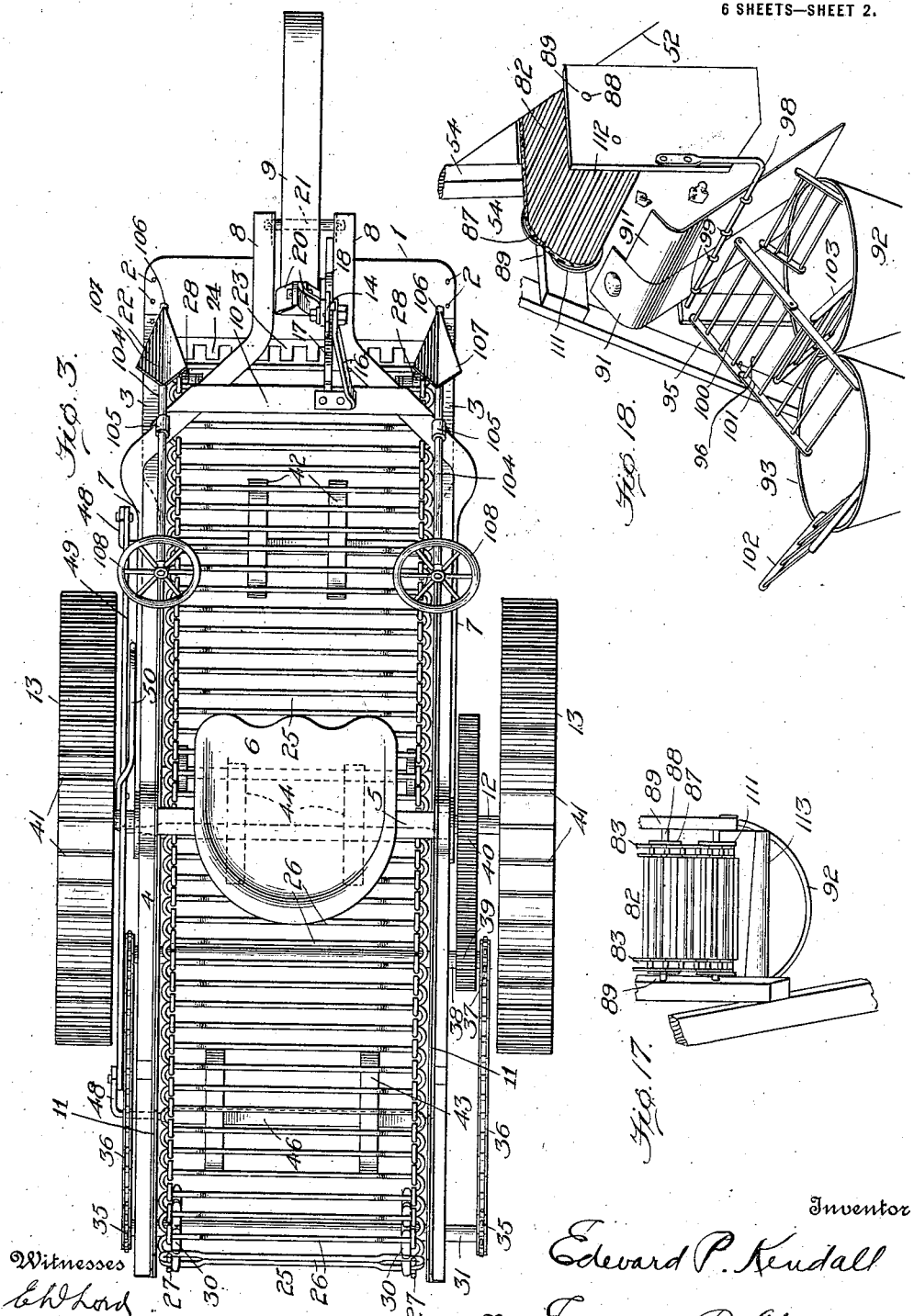

E. P. KENDALL.
POTATO HARVESTER.
APPLICATION FILED SEPT. 27, 1912.
1,199,704.
Patented Sept. 26, 1916.
6 SHEETS—SHEET 3.
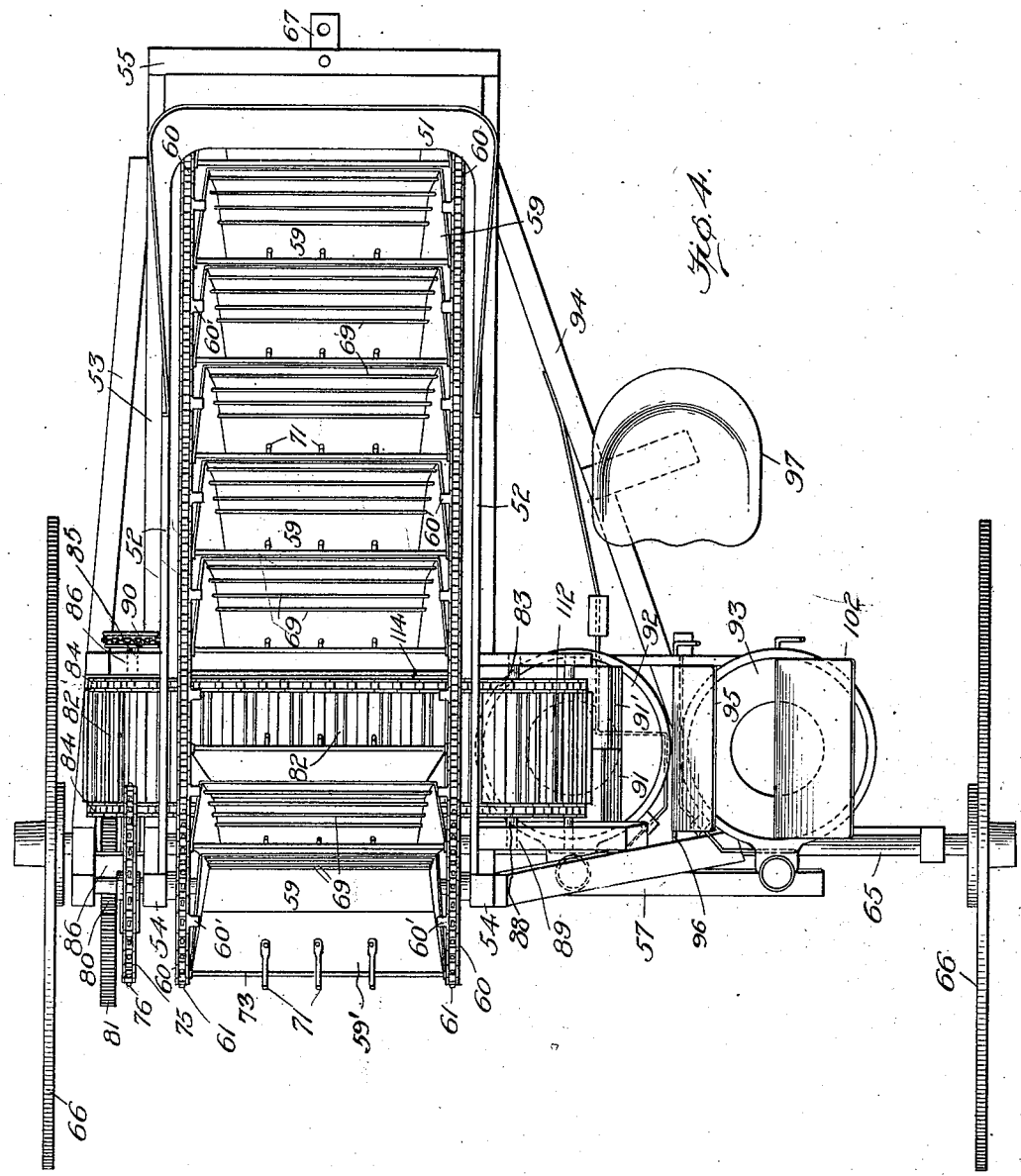
Witnesses
Inventor
Edward P. Kendall
By Edward R. Alexander
Attorney

E. P. KENDALL.
POTATO HARVESTER.
APPLICATION FILED SEPT. 27, 1912.

1,199,704.

Patented Sept. 26, 1916.
6 SHEETS—SHEET 4.

Witnesses
E. D. Lord
L. C. Brady

Inventor
Edward P. Kendall
By
Edward R. Alexander
Attorney

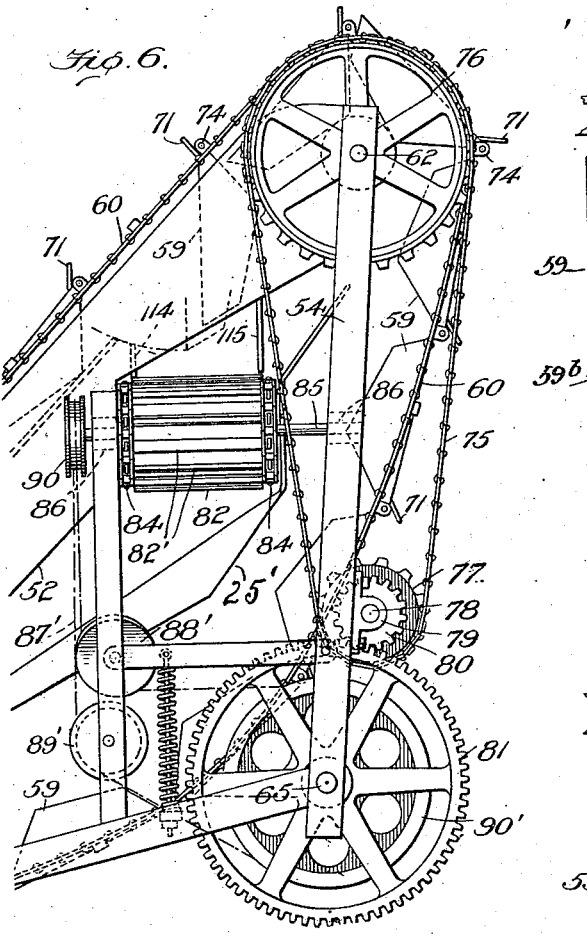

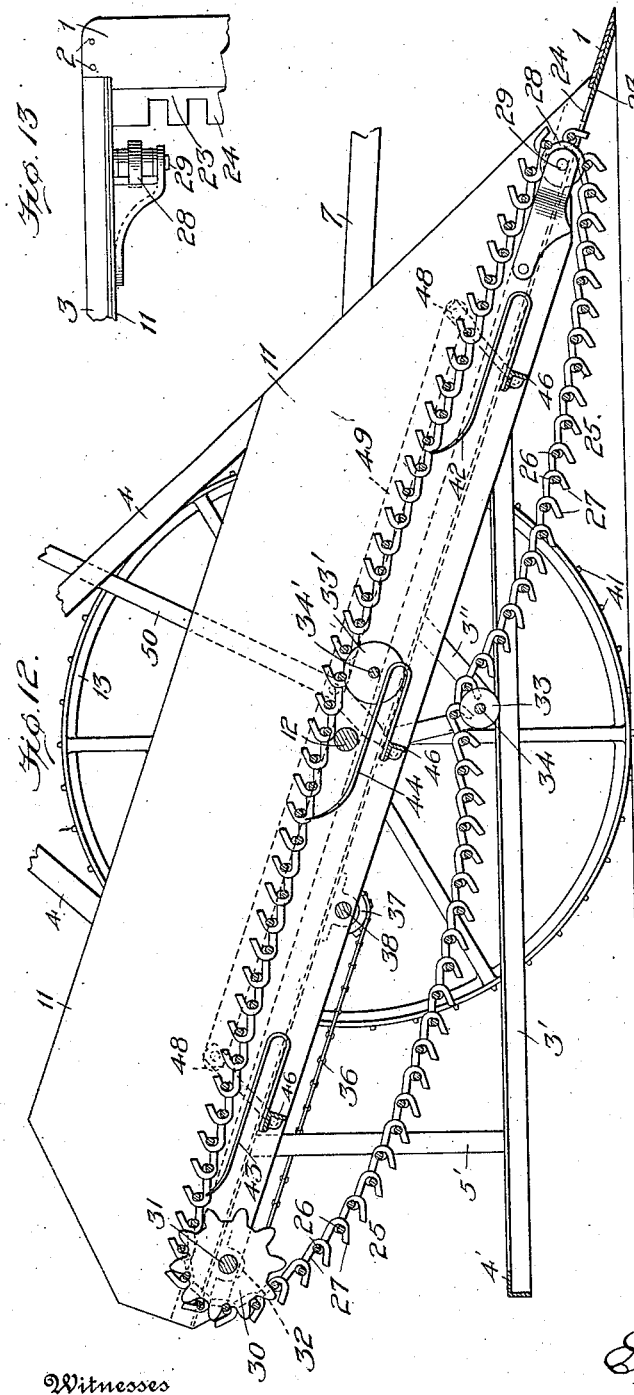
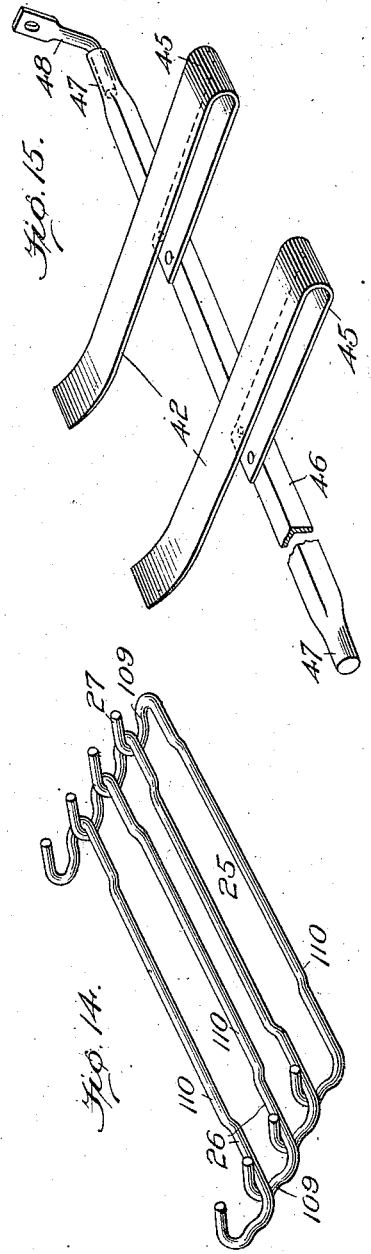

UNITED STATES PATENT OFFICE.

EDWARD P. KENDALL, OF BOWDOINHAM, MAINE.

POTATO-HARVESTER.

1,199,704.　　　　　Specification of Letters Patent.　　Patented Sept. 26, 1916.

Application filed September 27, 1912. Serial No. 722,722.

*To all whom it may concern:*

Be it known that I, EDWARD P. KENDALL, a citizen of the United States, residing at Bowdoinham, in the county of Sagadahoc and State of Maine, have invented certain new and useful Improvements in and Relating to Potato-Harvesters, of which the following is a specification.

This invention relates to apparatus for harvesting potatoes and has for its object the provision of apparatus capable of digging or scooping up the potatoes and other neighboring materials such as soil, vines, turfs and heavier solid substances such as rocks, and effecting a separation of the potatoes from all the other materials referred to and finally delivering the potatoes, preferably to a suitable receptacle.

To this end the invention consists in the provision of apparatus comprising means for digging or scooping up the potatoes and the said other materials, together with means arranged to receive said potatoes and other materials and capable of taking advantage of the differing physical characteristics of the potatoes and the other materials dug up therewith to effect the separation referred to.

In order to make the invention more clearly understood I have shown in the accompanying drawings means for carrying the same into practical effect, without limiting my improvements, in their useful applications, to the particular constructions which, for the sake of example, I have illustrated.

Figure 5:
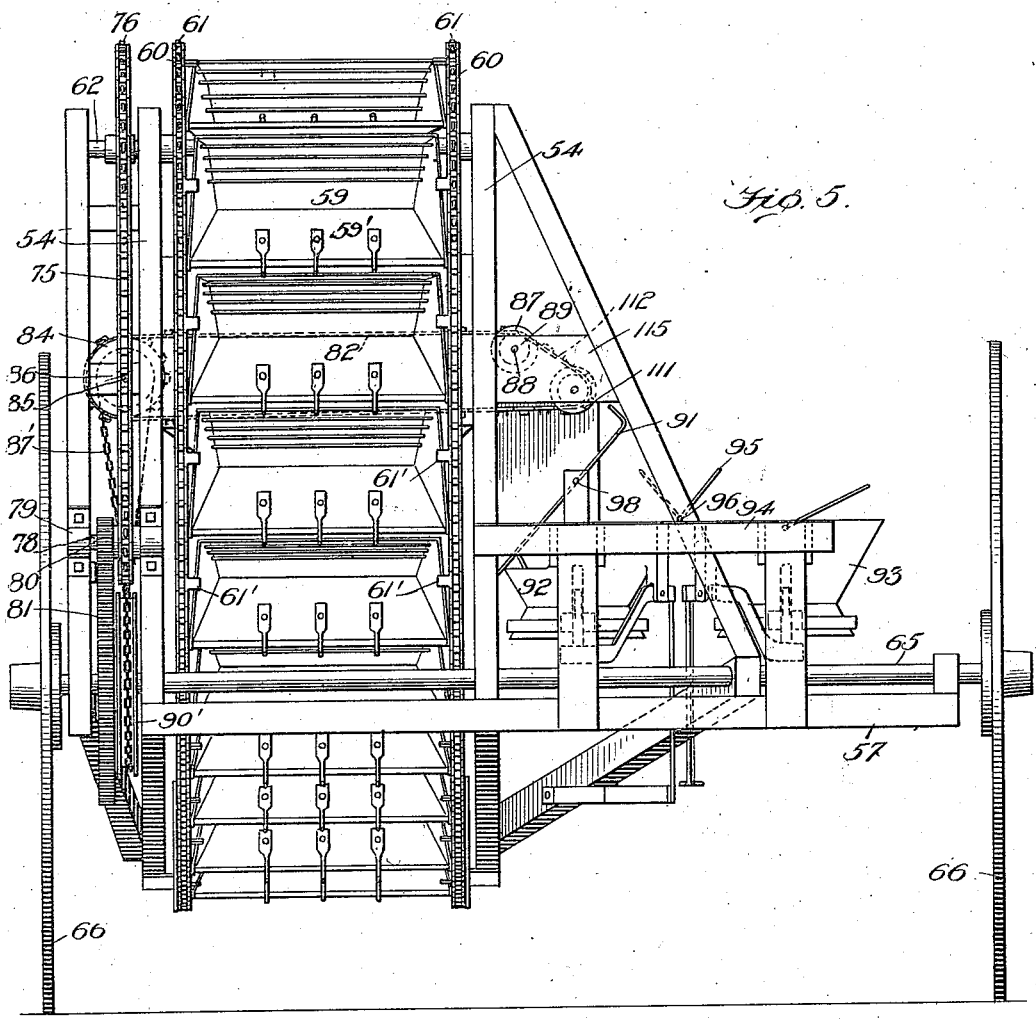
Figure 16:
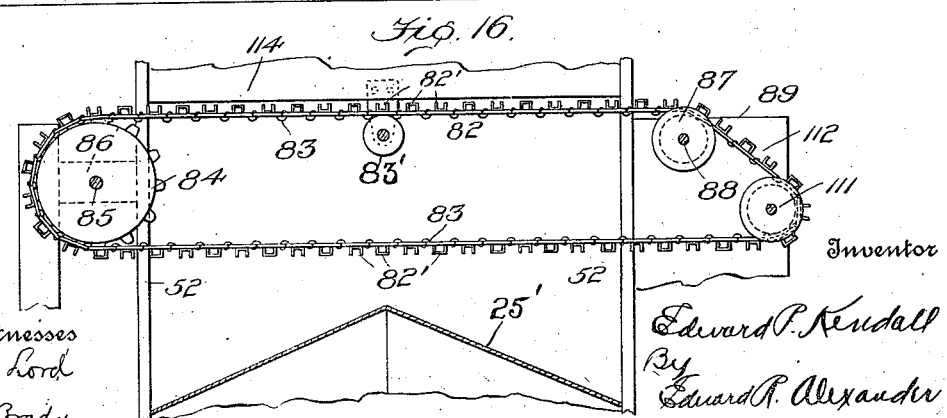

In said drawings:—Figure 1 is a side elevation of a potato harvester, embodying my invention, the same being shown viewed from the offside of the machine. Fig. 2 is a side view, partly in section, on a larger scale, looking from the near side of the machine, showing the digger or scoop, the screening conveyor and some of their related parts. Fig. 3 is a plan view of the digger or scoop, and the screening conveyer. Fig. 4 is a plan view of the elevating and transverse conveyers, and the means for receiving and bagging the separated potatoes. Fig. 5 is a rear elevation of the same. Fig. 6 is an elevation looking from the near side of the machine, showing the transverse conveyer and its driving devices, and a portion of the elevating conveyer. Fig. 7 is a plan view of one of the elevating buckets. Fig. 8 is an end view of the same. Fig. 9 is a plan view of a portion of the transverse conveyer. Fig. 10 is an edge view of a portion of the upper run of the same. Fig. 11 is an end view of the parts shown in Fig. 10. Fig. 12 is a longitudinal vertical section, viewed from the off-side of the machine, showing the digger or scoop, the screening conveyer, and related parts. Fig. 13 is a plan view of a portion of the forward part of the same. Fig. 14 is a perspective view of a portion of the screening conveyer. Fig. 15 is a perspective view of one pair of the springs employed to give vertical movement to parts of the screening conveyer showing also the pivotal support of the said springs. Fig. 16 is a vertical section taken longitudinally through the transverse classifying conveyer and showing some of the associated parts. Fig. 17 is a plan view at the delivery end of the transverse conveyer. Fig. 18 is a perspective view of some of the parts at the delivery end of the transverse conveyer.

Referring to the drawings, 1 is a digging appliance or blade adapted to enter the earth to a point below the potatoes and to be propelled horizontally, as by horse power, to scoop up the potatoes with the neighboring earth and vines, and such pebbles and stones as may be present. The digger 1 is secured, as by rivets to the front lower end of angle irons 3 which extend upwardly and rearwardly and form a part of the frame of the machine. The digger 1 is substantially of uniform width, its forward corners only being slightly rounded. This digger or knife 1 is adapted to enter the earth beneath a hill of potatoes and scoop up and direct the potatoes and material in its path rearwardly with little or no tendency to crowd out the potatoes and dirt from the sides of the knife or blade. In practice I have been using a knife about four and one half inches wide.

4 indicates bracing and seat supporting angle irons riveted to the irons 3 and arching upward to the proper height. At the top they are united by a cross bar 5 on which is fixed the driver's seat 6.

7 indicates substantially horizontal frame bars attached at their rear ends to the frame angle irons 3 and extending forward and inward, their front ends 8 forming a means for the adjustable connection of the draft tongue 9. The latter may be short and adapted for the attachment at its front end of the double-tree of a team of horses.

10 indicates a brace bar which is attached at its ends to the frame parts 3, passing up and over the frame bars 7.

11, 11 are side boards fixed on the bars 3. 3' indicates horizontal frame bars attached at their front ends to the bars 3, connected by a rear cross bar 4' and united near their rear ends with the bars 3 by vertical braces 5'. This frame is supported on a cross-axle 12 carried by ground wheels 13 fixed on said axle, and the frame may tilt on the axle for the depression of the digger knife to the desired depth, or to lift the digger knife to the surface of or clear of the ground. Such tilting of the frame may be effected by raising or lowering the tongue 9 to raise or lower the point of draft. This is effected by a hand lever 14 operating on a pivot 15. The latter has bearings in a bracket 16 fixed on the brace 10.

17 is a toothed segment for locking the lever in a well known manner after it has been adjusted. The segment is mounted on the pivot 15 and is fixed to the frame by an arm 18 which is attached to one of the bars 7. The short arm 19 of the lever is connected by link 20 to the rear end of the tongue 9, which is pivoted at 21 between the bars 7. The lifting of the said links by the hand lever causes the front end of the tongue and the point of draft to be lowered and the digger knife 1 raised, and a reverse operation of the parts causes the digger knife to be depressed to the desired depth.

22 is a rotary metal guard, one at each side of the lower end of the digger frame. Each guard comprises a shaft 104 mounted in bearings 105, 106 on the digger frame, on which shaft are fixed wings 107 and a hand wheel 108. By the latter the guard may be turned on its axis to throw off, to the ground, any large stone, or any collection of stones or vines which may become lodged against the guard.

23 is a sheet iron plate attached to the rear of the digger knife or blade 1 and having rearwardly extending tongues 24. These tongues and the spaces between them are or may be about one inch wide. The potatoes, earth, etc., pass from the digger knife 1 at once over this plate and, while the potatoes will not pass through the said spaces, a considerable quantity of the earth and pebbles is at once got rid of before they reach the screening or sifting conveyer. The latter is shown at 25. It consists of a series of transverse rods 26 mounted at their ends in or on endless chains 27, or formed at their ends and linked together so as to form in effect two such endless chains (Fig. 14), and spaced apart so as to allow earth and pebbles to sift between them to the ground below but to retain and convey the potatoes. When constructed so that parts of the rods 27 form the chains, the ends of the bars are bent into S-shaped links 109 integral with the rods, which links are hooked into each other as shown. The body of each rod between its ends may be bent out of its axial line, or offset, as shown at 110, (Fig. 14), to better engage the material to be elevated. At their forward lower ends the chains 27 are mounted on flanged pulleys 28, the journals of which are studs 29 fixed on the machine frame. The upper ends of the chains are mounted on driving sprocket wheels 30 fixed on a shaft 31 mounted in suitable bearings 32 on or under the digger frame. The lower limb or run of the conveyer 25 has some slack which is held up by wheels 33 on a cross shaft 34 carried by brackets 3" attached to the side members 11, 11. Also I support the upper limb or run of the conveyer 25 by wheels 33' loose on a shaft 34' mounted in the frame bars 3.

35 indicates sprockets on the ends of the shaft 31 and driven by chains 36 from sprockets 37 on a counter shaft 38. The latter has fixed on it a pinion 39 engaged and driven by a gear wheel 40 on the ground wheel axle 12. The arrangement of the gearing and driving connections is such that the forward motion of the machine and rotation of the ground wheels will drive the upper limb or run of the conveyer 25 rearwardly. The wheels 13 may be provided with ground-engaging projections 41 to prevent slippage and insure an efficient driving of the conveyer.

42, 43, 44 indicate agitating springs arranged beneath the upper limb of the conveyer 25 so that the conveyer rods 26 receive a vibratory impulse as they ride over the free ends of the springs and snap off from the same, and each succeeding rod receives a blow from the springs as they are released by a preceding rod. These springs are so arranged relative to the upper run of the conveyer 25 that their free ends are successively engaged by the conveyer rods 26 as the rods traverse upwardly and rearwardly during the operation of the mechanism. This movement of any rod in engagement with the upper free end of any spring tends to depress the free end of the spring and place it under tension in accordance with the amount of such depression or deflection, so that when the conveyer rod in question snaps off the end of the spring, that end of the spring delivers a severe blow to the succeeding conveyer rod in the series, thereby agitating or violently shaking the material on that part of the conveyer and tending to break up the clods of earth and to cause the same to be screened rapidly through the conveyer and at the same time to separate potatoes from the vines. The agitating springs are preferably arranged in pairs, and so as to act on different parts of the rods at different points along the upper run of the conveyer. Thus, the pair of springs 42, at the lower part of the conveyer, act beneath the middle parts of the conveyer rods, the pair of springs 43 at the upper part of the conveyer act near the outer ends of the rods, and the intermediate pair of springs 44 act on the rods between their middles and their outer ends. All parts of each rod are thus thoroughly agitated in a peculiar manner by sharp movements and blows to shake the potatoes from the vines and separate foreign matter from the potatoes and cause it to sift down between the rods, and to cause the vines to ride on the top of the conveyed material ready for their subsequent separation and removal. The springs are formed with lower return bends 45 which are secured, as by riveting, to transverse angle irons 46 the ends of which are shaped as or provided with journals 47 mounted in bearings in or on the side members 11, 11. At one side of the machine the irons 46 have attached to them crank arms 48 connected with a pitman or link 49 by the longitudinal movement of which the cranks are turned to tilt the irons 46 and the agitating springs, thus causing the springs to bear with the desired degree of pressure at their free ends against the under sides of the rods 26.

50 is a hand lever which is formed with or is attached to one of the crank arms 48, by which lever, the pitman 49 can be moved to operate and adjust all of the springs as above described.

At its rear end the conveyer 25 is arranged in juxtaposition to an endless bucket elevating conveyer, and delivers thereinto the potatoes, rocks, vines and all materials which have not been separated from the potatoes.

51 is a hopper fixed on the lower end of the elevator frame, which frame comprises sides 52, sills 53, posts 54 and cross pieces 55 and 57. At its rear part this frame is mounted on an axle 65, on which are fixed ground wheels 66. At its front part the frame is provided with a plate 67 which rests on the front frame and is connected therewith by a king bolt 68. Between the sides 52 is fixed a bucket guide 58.

The bucket conveyer or elevator comprises a series of buckets 59, each pivotally connected at one side 59' with two endless chains 60 which run on driving sprockets 61. The latter are fixed on a shaft 62 mounted in the upper part of the frame. At their lower forward ends, the chains 60 run on idler sprockets or pulleys 63 mounted loosely to rotate on a shaft 64. The latter is mounted in the lower part of the elevator frame. One edge of each bucket side 59' is bent into a sleeve 73 surrounding a transverse rod 74, which rod is attached at its ends to the chains 60, thus forming a pivot on which the bucket may swing. The lower limb or run of the bucket conveyer has considerable slack, leaving between the two limbs space for a transverse conveyer hereinafter described.

Each bucket 59 is provided with a grid a little above its bottom $59^a$ and arranged at an angle both to said bottom $59^a$ and the side $59^b$ of the bucket, and preferably formed by transverse rods 69 spaced close enough to sustain the potatoes but to allow earth and pebbles not yet separated to sift down during the elevating movement of the bucket and collect in the lower corner thereof between the bottom $59^a$ and side $59^b$. Each grid is so disposed that the potatoes will readily roll off from it as the bucket dumps, but the tendency of other material is to remain on the grid. The bottom $59^a$ of each bucket forms with the side 59' a transverse corner or bend 70 which rides on the guide 58 with minimum friction in that there is but a single transverse line of contact between the bucket and the guide. On its side 59' each bucket is provided with vine or weed carriers in the form of upstanding fingers or hooks 71 having at their lower ends plates 72 which are riveted to the bucket wall. These fingers catch the vines as they fall from the conveyer 25 and carry them upward, the potatoes, stones, etc., settling below the vines into the bottoms of the buckets. The guide 58 terminates a certain distance below the top of the bucket elevator, and as each bucket leaves the said guide it swings downward allowing the potatoes to roll off from its grid, with possibly some stones, etc., which are not below the grid and do not cling between its rods or do not otherwise remain in the bucket. The vines on the carriers 71 and the material left in the bucket, such as sods and small tufts of grass and parts of the vines clinging on or between the bars of the grid, etc., are carried onward and dumped at the rear of the machine as the buckets turn over the shaft 62. As the buckets return on the lower limb or run of the conveyer they are prevented from falling therethrough, and are kept in line with the chains by inward bucket-supporting projections 60', 60', fixed on the chains.

The shaft 62 with its driving sprockets and bucket conveyer is actuated by a chain 75 which connects a sprocket wheel 76 fixed on said shaft with a sprocket pinion 77 fixed on a countershaft 78. The latter is mounted in bearings 79 on the elevator frame and has fixed thereon a pinion 80 which meshes with a gear wheel 81 on the ground wheel axle 65.

25' is a suitably supported shield arranged below the upper run of the bucket conveyer mechanism. The shield is declined downwardly in opposite directions from its central longitudinal axis and serves to deflect material screened through the conveyer mechanism to either side of the apparatus.

82 is a transversely disposed, endless conveyer and separator member, having its upper limb substantially horizontal and arranged below the upper limb of the bucket conveyer so as to receive the potatoes, stones, etc., which are spilled by the buckets as they leave the guide 58. While the transverse conveyer and separator member 82 is shown transverse to the longitudinal line of the machine, and this arrangement is a convenient one, this conveyer and separator member may receive and deliver material in a rearward manner without necessarily being transverse in location. The conveyer and separator member 82 comprises a series of U-shaped bars 82' attached at their opposite ends to endless chains 83. Alternate bars 82' may be inverted to give a free roll to the potatoes at the delivery end of the conveyer and separator member, to be hereinafter referred to. These chains 83 are driven by sprockets 84 fixed on a shaft 85, which is mounted in suitable bearings 86 on the elevator frame. At the other end of the conveyer the chains 83 are mounted on flanged pulleys 87 mounted loosely on a shaft 88. The latter is mounted in bearings 89 fixed on the elevator frame. The shaft 85 has fixed on it a belt pulley 90 through which it may be actuated from a pulley 90', fixed on the gear wheel 81 or axle 65, by a belt or chain 87' passing over guide pulleys 88', 89'.

83' indicates a supporting roller or sprocket, which may be provided for the front chain 83. It is preferably arranged substantially midway between the ends of the conveyer 82.

The delivery end of the transverse conveyer and separator member is or may be located at a little distance beyond the bucket conveyer, and the pulleys 87 are of relatively small diameter so that the bars 82' turn quickly and sharply away from the horizontal plane of conveyance as they reach and pass over the said pulleys. This movement throws the potatoes, which are rounded and elastic and tend to pull, a little beyond the end of the conveyer 82 and over the top edge of deflectors 91, 91', but any earth collected in the grooves of the bars 82' will not be so thrown but will be carried downward and dropped on the other or inner side of the said deflectors, whence it slides to the ground. Also stones, being angular, for the most part, and relatively heavy and inelastic, cling to the conveyer and are delivered more directly downward at the inner side of the deflectors. In many instances the edges of the bars 82' catch on the edges or projections of the stones and retain them close to the end of the conveyer as it delivers them; or the stones will tend to stick between the bars 82'. Also any tufts of grass and sods cling close to or partly between the bars 82' and drop directly down between the deflectors and the conveyer. While the delivery end of the transverse conveyer and separator member may pass over a single pair of pulleys, I prefer to provide it with an additional pair of pulleys 111 arranged a little lower and farther out than the pulleys 87, thereby giving a downward inclination of about 45 degrees to the end of the conveyer, as shown at 112, on which the potatoes may roll and acquire a little more outward velocity, while other material will follow downward more slowly on the incline. This difference in velocity promotes the desired separation of the potatoes from the other material. The potatoes as a rule will be collected along the rear part of the transverse conveyer and separator member 82 and the stones, as well as the sods and tufts, along the front part of it. This is because the stones or rocks remain on the transverse conveyer immediately below their point of delivery from the dumping bucket, while the potatoes will bound back to the opposite or rear side. This separation may be said to take place because the whole mass of conveyed material turns a corner, promoting the segregation of the different classes of material. Along the front and rear edges of the transverse conveyer and separator member are arranged guard plates 114, 115 to confine the material on the conveyer. The buckets 59 drag slightly over the guard 114 and the bottom of each succeeding bucket serves as a wall to arrest the potatoes on the conveyer as they are delivered from the preceding bucket. And the succeeding buckets drag against any potatoes which may remain on the front part of the conveyer and roll them to their proper place on the rear part of the conveyer. The rear deflector 91, in the classification line of the potatoes on the conveyer and separator member 82, is or may be longer than the deflector 91', so that its upper end is nearer to the delivery end of the conveyer, thus preventing the dropping down of potatoes on to the inner side of the deflector 91, with very little chance of catching any stones. The deflector 91' in line with the collection of stones, on the conveyer and separator member 82 may be made shorter, so that it terminates farther from the conveyer 82, thus giving more room for the dropping of the stones with very little chance of failing to collect all of the potatoes. I prefer to make the deflectors 91, 91' separate, and to pivot them individually upon a transverse rod 98 by means of suitable bearings 99 fixed on the deflectors. The rod 98 is attached to a suitable part of the frame. The said deflectors are thus capable of turning individually on the rod 98 as may be required to allow any large or wedge shaped rocks to pass down through the space between the end of the conveyer and the deflectors. After thus turning, the deflectors return by gravity to the normal position shown. In place of the deflectors 91, 91' a single deflector 113 may be employed, as shown in Fig. 17, which inclines outward away from the end of the conveyer, so as to leave a wider space where the stones are delivered. Beyond the said deflectors is or may be situated any suitable receptacle for the potatoes. By preference I provide for bagging the potatoes on the machine.

92, 93 are bagging hoppers supported on a frame 94 extending laterally from the elevator frame and also supported on the axle 65. The two hoppers are both in line with the transverse conveyer and between them is mounted a switch plate 95 on a horizontal axis 96. This plate may be inclined upwardly and inwardly to a point at or near the top of the deflectors 91, 91', to direct potatoes into the outer hopper 93, or it may be inclined upwardly and outwardly to direct them into the inner hopper 92.

The deflectors 91, 91' or 113 are so supported that their lower ends operate as weights tending to swing them into a vertical position. The deflectors are maintained in an inclined position by engagement with a limiting means, such as one side of the adjacent receptacle, as shown in Fig. 5, and when operated to permit the passage of a rock, their lower ends cause them to return automatically to normal position.

97 is a seat fixed on the frame 94, for the operator who applies bags, to be filled with potatoes, alternately to the two hoppers and alternately ties and removes them as they are filled.

The plate 95 is preferably in the form of a grid of bars 100 fixed in side pieces 101. Opposing the part 95 may be arranged grids 102, 103 at or partly within the mouths of the hoppers. The potatoes will rebound from one grid to another on their way to the hoppers while any stones or rocks which may escape separation to this point will lodge between the bars of the grids and may be removed by hand by the bagging operator.

In operation, the digger knife 1 is directed to enter the ground and scoop up the potatoes which are grown in rows. I have invented a knife which in actual practice tends to deliver the potatoes, earth, etc., quickly and directly to the screening conveyer with little or no tendency to deflect any of the material or potatoes toward the sides of the machine in such manner that they will be thrown aside from the screening conveyer, as is the common tendency of all pointed blades or knives with which I am familiar. As soon as the potatoes and other material reach the screening conveyer, they are subjected to violent agitation in accordance with the adjustment of the agitating springs. I have found in actual practice that with the use of my agitating springs two horses will be able to do the work where four were necessary in the absence of such springs. This may be attributed to the fact that the screening action of the screening conveyer is a rapid and efficient one. The same amount of dirt, pebbles, small stones, etc., is not carried up on my screening conveyer as has been my experience with all screening conveyers not provided with my agitating springs. The greater the load or weight of material on the screening conveyer the more the power necessary to elevate such load or propel the screening conveyer, and as this power is derived from the ground and driving wheels of the digging apparatus, the traction of the wheels must be sufficient, otherwise they will slip along the ground instead of working. With my improved agitating springs I am enabled to dispense with the ordinary traction cleats or spurs on the ground and drive wheels and still use fewer horses or less power for propelling the digger. In addition to the above, the agitating springs facilitate and assist in the separation of the potatoes themselves from the vines, the vibration imparted being sufficient to effect such separation to a highly satisfactory degree.

The screening conveyer delivers the material on it to the endless bucket elevator, which in itself has screening characteristics for the material which it receives, in that the vines will rest upon the top of the buckets, to a large extent, allowing the potatoes, stones, dirt, etc., to drop into the buckets proper. This relative arrangement of the materials on the endless bucket conveyer is largely brought about at the very time of their delivery thereto from the screening conveyer and is due, I believe, to the relative arrangement of the two conveyers and the manner in which the one discharges the materials to the other, as well as to the differing physical characteristics of said materials. Inside of the buckets a further classification may take place owing to the peculiar construction of the buckets and the grids therein. The prongs or fingers on the tops of the buckets serve to insure the elevating of the vines and their delivery from the top of the elevating conveyer. The grids within the buckets afford means for separating earth and pebbles from the larger mass of material delivered to the buckets and to retard the discharge of stones, turfs, etc., as compared with the potatoes which will readily roll off of the grids. When the material within the buckets is delivered therefrom to the transverse conveyer and separator member, such material has to turn a corner. The heavier masses, such as stones, are delivered to this transverse conveyer and separator member and for the most part arrange themselves along the front sides of the upper run of the conveyer, whereas the potatoes being more resilient become arranged or collected at one side of the stones near the rear side of the transverse conveyer and separator member. The construction and arrangement of this member is such as not only to facilitate a classification of material received by it on its upper run as just described, but the upper surface of the conveyer, formed as it is of U-shaped slats, serves in the separation and classification of the materials as they are delivered at the end of this conveyer and separator member. The potatoes being more resilient and of a rounded conformation, tend to roll forward and, as hereinbefore explained, are thrown farther from the end of the conveyer and fall at a greater distance therefrom than do the stones and masses with higher specific gravity, and the turfs and sods cling to the bars of this separator and conveyer member and are discharged beneath the machine. In actual practice I have found that very few stones are delivered beyond the deflector plates 91, 91' or the deflector plate 113, and where they succeed in getting over these plates, they are substantially all arrested by the grids 100, 102, 103, where they may be removed by the bagging operator. It will of course be understood that in those potato digging and elevating appliances heretofore used in which the elevator is constructed so as to screen certain or all of the earth from the potatoes, vines, etc., small pebbles or small stones may be screened in the process of elevation of the potatoes, vines, sods, etc., but that my invention has to do with the complete separation of potatoes from foreign substances dug up with them, including rocks or stones which are not screened by any screening mechanism for the soil and which for example may be as large as some of the potatoes to be harvested or larger, since it will be understood that if the rocks are as large or larger than the potatoes, they will not be screened by any of the mechanism through which soil is screened and that in referring in the claims to stones or rocks, I mean those stones or rocks which are not screened along with the soil from the potatoes, vines, sods and grass.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

What I claim is:—

1. In apparatus of the class described, the combination of means for receiving and dumping potatoes and neighboring materials dug up therewith including soil, turf, vines and heavier substances such as rocks, and means receiving said potatoes and some of said materials from the first named means and co-acting therewith in separating the potatoes from all said materials including heavier substances such as rocks too large to be separated from the potatoes by screening.

2. In apparatus of the class described, the combination of means for receiving and dumping potatoes and neighboring materials dug up therewith including soil, turf, vines and heavier substances such as rocks, and means receiving said potatoes and some of said materials from the first named means and co-acting therewith in separating the potatoes and the rocks inseparable therefrom by screening from substantially all the other materials and substances, and for finally separating the potatoes from said rocks.

3. In apparatus of the class described, the combination of means for receiving and dumping potatoes and neighboring materials dug up therewith including soil, turf, vines and heavier substances such as rocks, a potato receptacle, and means interposed therebetween for receiving said potatoes and some of said materials from the first named means and co-acting therewith in separating the potatoes and the rocks inseparable therefrom by screening from substantially all the other materials and for finally separating the potatoes from the said rocks and delivering the potatoes into said receptacle.

4. In apparatus of the class described, the combination of means arranged to receive potatoes and neighboring materials dug up therewith including earth, rocks, turfs and vines, comprising a classifying conveyer having drop sections in which the potatoes and materials are collected and partially separated, and a second conveyer and separator member arranged to receive potatoes and materials from said drop sections and to effect a further separation of rocks and potatoes.

5. In apparatus of the class described, the combination of means arranged to receive potatoes and neighboring materials dug up therewith including rocks, and effect a partial separation thereof, a receptacle, and means between the said receiving and partial separating means and said receptacle for separating the potatoes from the rocks too large to be screened therefrom and delivering the potatoes into the receptacle.

6. In apparatus of the character described, the combination of means arranged to receive potatoes and neighboring materials dug up therewith including rocks, and effect a partial separation thereof, a receptacle for receiving the potatoes, and an endless conveyer and separator member interposed between said receiving and partial separating means and said receptacle for separating potatoes from the rocks and delivering the potatoes into said receptacle.

7. In apparatus of the class described, the combination of means arranged to receive potatoes and neighboring materials dug up therewith including heavy substances such as rocks too large to be screened from the potatoes, and effect a partial separation thereof, a collecting receptacle, and means arranged between said receiving and partial separating means and the receptacle for separating the potatoes from the rocks and delivering them into said receptacle.

8. In apparatus of the class described, the combination of means arranged to receive potatoes and neighboring materials dug up therewith including rocks and effect a partial separation thereof, a collecting receptacle, and means arranged between the initial receiving and partial separating means and the receptacle for separating the potatoes from the rocks and delivering the potatoes into the receptacle substantially free of rocks irrespective of the size of the rocks which may have been received with the potatoes.

9. In apparatus of the character described, the combination of means arranged to receive potatoes and neighboring materials dug up therewith including earth, turfs, vines and heavier substances such as rocks and effect a partial separation thereof, a receptacle for receiving the potatoes, and means interposed between said initial receiving and separating mechanism and said receptacle for separating the potatoes from the rocks, turfs and vines and delivering the potatoes into said receptacle.

10. In apparatus of the class described, the combination of an endless conveyer arranged to receive potatoes with neighboring materials dug up therewith including earth, turf, vines and heavier substances such as rocks and to dump them, a transverse conveyer and separator member arranged at the rear of the machine for receiving the potatoes and heavy material such as rocks from the endless conveyer, a receptacle beyond the end of the transverse conveyer and separator member for receiving the potatoes, a deflector between the transverse conveyer and separator member and the receptacle for deflecting the rocks, and means for operating the said conveying devices.

11. In apparatus of the class described, the combination of an endless conveyer arranged to receive potatoes with neighboring materials dug up therewith including earth, turf, vines and heavier substances such as rocks, and having a series of dumping sections, a transverse conveyer and separator member for receiving the potatoes and heavy material such as rocks from the said sections and partially separating the potatoes from such heavy material, means for collecting the potatoes from the transverse conveyer and separator member, and mechanism for operating the said conveying devices.

12. In apparatus of the character described, the combination of mechanism comprising a series of dumping sections having means for supporting vines and permitting the separation of the potatoes, rocks and turfs therefrom and the collection of the potatoes, rocks and turfs in said sections, and means for separating the potatoes from the rocks and turfs including mechanism for effecting the dumping of said sections.

13. In apparatus of the character described, the combination of mechanism comprising a series of dumping sections having means for supporting vines and permitting the separation of the potatoes, rocks and turfs therefrom and the collection of the potatoes, rocks and turfs in said sections, means carried by said sections for causing partial separation of the potatoes from the rocks and turfs, a receiving and discharge mechanism for the potatoes and rocks operating to maintain them substantially in classified order, and means for effecting the dumping of said sections whereby said potatoes, rocks and turfs are delivered to said receiving and discharge mechanism.

14. In apparatus of the character described, the combination of a conveyer having dumping sections provided with means for engaging rocks and when the sections are dumped tending to retain them, means for delivering potatoes, turf, vines and heavier substances such as rocks to the said sections, means for collecting the potatoes as they are dumped, and mechanism for operating the said conveyer.

15. In apparatus of the character described, the combination of a conveyer having dumping sections provided with grids arranged at one side of said sections for engaging and tending to retain rocks and separating fine material from potatoes, means for delivering the potatoes, turf, vines and heavier substances such as rocks to the said sections, means for collecting the potatoes as they are dumped, and mechanism for operating the said conveyer.

16. In apparatus of the character described, the combination of a conveyer having dumping sections provided with grids for engaging and tending to retain rocks and separating fine material from potatoes, means for delivering the potatoes, turf, vines and heavier substances such as rocks to the said sections, means for collecting the potatoes as they are dumped, and mechanism for operating the said conveyer.

17. In apparatus of the character described, the combination of a transverse conveyer and separator member, an endless conveyer arranged to deliver potatoes and rocks to said transverse conveyer and separator member and provided with dumping sections delivering above said transverse conveyer and separator member, whereby the rocks are mainly delivered and accumulated along one side of said transverse conveyer and separator member and the potatoes bound, roll to and mainly accumulate along the other side of said transverse conveyer and separator member, and means for collecting the potatoes from the transverse conveyer and separator.

18. In apparatus of the character described, the combination of a plurality of dumping sections connected together in endless series, means carried by said sections for conveying vines rearwardly and permitting the separation of potatoes and rocks therefrom, and means for dumping the sections at a predetermined point.

19. In apparatus of the character described, the combination of a plurality of dumping sections connected together in endless series, means carried by said sections for conveying vines rearwardly and permitting the separation of potatoes and rocks therefrom, separate means carried by said sections for effecting partial separation of the potatoes and rocks, and means for dumping the sections at a predetermined point.

20. In apparatus of the character described, the combination of a plurality of dumping sections connected together in endless series, means carried by said sections for conveying vines rearwardly and permitting the separation of potatoes and rocks therefrom, separate means carried by said sections for effecting partial separation of potatoes and rocks, means for dumping the sections at a predetermined point, and an endless receiving member for conveying away the classified rocks and potatoes.

21. In apparatus of the class described, the combination of a plurality of dumping sections connected together in endless series and each provided with separating grids, an endless receiving member arranged in juxtaposition to said plurality of sections, means for dumping the sections successively for delivering separated potatoes and material such as rocks onto said endless receiving member and maintaining the potatoes separate from the said material, and a receiving device for said potatoes.

22. In apparatus of the character described, arranged to receive potatoes and neighboring materials dug up therewith including earth, rocks and vines, the combination of a conveyer and separator member for the partially classified materials and potatoes, means for partially classifying the potatoes, rocks and vines and discharging the vines at the rear of the apparatus and delivering the potatoes and rocks in substantially classified arrangement to said conveyer and separator member.

23. In apparatus of the character described, arranged to receive potatoes and neighboring materials dug up therewith including earth, stones and vines, the combination of a conveyer and separator member for the classified material and potatoes, mechanism arranged for assisting in classifying the potatoes, stones and vines, discharging the vines at the rear of the apparatus and delivering the potatoes and stones in substantially classified arrangement to said conveyer and separator member, and means coöperating with said conveyer and separator member for maintaining the classified material and potatoes thereon.

24. In apparatus of the character described, the combination of a conveyer and separator member, means for dumping potatoes and rocks thereon, said member having a downwardly inclined delivery end for causing the potatoes to roll off rapidly and be delivered at a distance from the end of the conveyer while the rocks fall close to the end of the same, and means for receiving the potatoes so delivered.

25. In apparatus of the character described, the combination of a conveyer and separator member arranged to receive potatoes and material such as rocks and composed of U-shaped bars, means for dumping potatoes and rocks thereon, whereby the rocks are caused to be held and delivered close to the end of the conveyer while the potatoes will fall at a greater distance from the same, and means for collecting the potatoes so delivered.

26. In apparatus of the class described, the combination of a conveyer and separator member arranged to receive potatoes and stones and having a downwardly inclined delivery end for causing the potatoes to roll off rapidly and be delivered at a distance from the end of the conveyer while the stones fall close to the end of the same, and a deflector coöperating with the inclined delivery end of said conveyer and separator member for directing the potatoes to one side and the stones to the other side thereof.

27. In apparatus of the character described, the combination of a conveyer and separator member, an endless conveyer arranged to deliver potatoes and material such as rocks to said conveyer and separator member and provided with dumping sections delivering above the conveyer and separator member, whereby said rocks are mainly delivered and accumulated along one side of this conveyer and separator member and the potatoes bound and roll to the other side of said conveyer and separator member, a deflector having a section for deflecting the potatoes arranged near the end of that side of said conveyer and separator member where the potatoes are accumulated, and a section for deflecting the rocks arranged more remotely from the end of that side of said conveyer and separator member on which the rocks are accumulated.

28. In apparatus of the class described, the combination of a conveyer and partial classifier for receiving potatoes and material to be classified including stones, means for collecting potatoes at the delivery end of the said conveyer, and a stone deflecting plate mounted near the delivery end of said conveyer and movable to permit the passage of large stones between the plate and the conveyer.

29. In apparatus of the class described, the combination of a conveyer and partial classifier for receiving potatoes and material to be separated therefrom including stones, L-shaped deflecting plates for potatoes and for stones at the delivery end of said conveyer arranged to leave a greater space at the end of the conveyer for the passage of the stones than for the passage of the potatoes, and means for collecting the potatoes.

30. In apparatus of the character described, the combination of conveying and separating mechanism arranged to receive potatoes and material to be separated therefrom including stones, a receptacle for receiving the potatoes from said conveying and separating mechanism, and a deflector device interposed between said mechanism and said receptacle for guiding the potatoes into said receptacle and for deflecting the said material outside thereof.

31. In apparatus of the character described, the combination of conveying and separating mechanism arranged to receive potatoes and material to be separated therefrom including stones, a receptacle for receiving the potatoes from said conveying and separating mechanism, and a deflector device interposed between said mechanism and said receptacle for guiding the potatoes into said receptacle and for discharging the said material outside thereof, the said deflector device being swingable to permit the passage of relatively large stones.

32. In apparatus of the character described, the combination of conveying and separating mechanism arranged to receive potatoes and material to be separated therefrom including stones, a receptacle for receiving the potatoes from said conveying and separating mechanism, a deflector device interposed between said mechanism and said receptacle for guiding the potatoes into said receptacle and for discharging the said material outside thereof, and grids arranged above said receptacle for catching stones.

33. In apparatus of the character described, the combination of a conveyer and partial classifier arranged to receive potatoes and material to be separated therefrom including stones, and means for deflecting and collecting the potatoes as they fall from the delivery end of said conveyer and including opposing grids adapted to arrest and catch stones.

34. In an apparatus of the class described, the combination of means arranged to receive potatoes and neighboring materials dug up therewith including earth, turf, vines and heavier substances such as rocks, comprising a classifying conveyer to receive said potatoes and materials and effect a partial separation thereof, particularly the rocks and potatoes from the vines, said conveyer having drop sections in which the potatoes and materials are collected, a conveyer and separator member arranged to receive potatoes and material from said drop sections and to effect a further separation of rocks and potatoes on its surface and to deliver potatoes and rocks into space, and a deflector arranged in juxtaposition to the delivery end of said conveyer and separator member for directing the potatoes delivered by said conveyer and separator member on one side and the rocks on the other side of said deflector.

35. In apparatus of the character described, the combination of conveying mechanism arranged to receive potatoes and neighboring materials dug up therewith including stones, earth and vines and comprising devices for supporting the vines and permitting the separation therefrom of the potatoes, earth and stones and a series of dumping sections arranged to collect the potatoes and stones, a conveyer and separator member arranged below the conveying mechanism for receiving the stones and potatoes as they are dumped and delivering them, means for dumping said sections, and means for separately collecting stones and potatoes delivered by said conveying and separator member.

36. In apparatus of the character described, the combination of means arranged to receive potatoes and neighboring materials dug up therewith including heavy substances such as rocks, and to screen the materials and partially separate the potatoes therefrom, the said means including a series of dumping sections for collecting the potatoes and rocks, a conveyer and separator member for receiving the potatoes and rocks from the sections when they are dumped and operating to completely separate the potatoes from the rocks, and means for collecting the potatoes separate from the rocks as they are delivered by said conveyer and separator member.

37. In apparatus of the class described, the combination of a conveyer and separator member arranged to receive potatoes and rocks and to separate the potatoes from the rocks, and a deflector arranged at the discharge end of said conveyer and separator member arranged to deflect the potatoes on one side thereof and to deflect the rocks on the other side of the said deflector.

38. In apparatus of the class described, the combination with a collector for potatoes, of mechanism for receiving potatoes and neighboring materials dug up therewith, including soil, turf, vines and heavier substances, such as rocks, separating the potatoes from said neighboring materials and delivering them to said collector, said mechanism including means for permitting the potatoes and neighboring materials to drop under gravity action and then be arrested, whereby partial classification of the potatoes and neighboring materials thus allowed to drop is effected owing to the difference in specific gravity and resiliency of the potatoes and neighboring materials, and additional means extending from said arrester to a point adjacent said collector and adapted to project the potatoes and neighboring materials into space, whereby owing to the resiliency of the potatoes they are directed into said collector whereas the remaining neighboring materials, including rocks, being less resilient and heavier, either or both, fall between said collector and said last described means.

39. In apparatus of the class described, the combination of a collector for potatoes, a final separator for potatoes and other materials which may be dug up therewith, the delivery end of said final separator being spaced from the collector and disposed so as to discharge the potatoes and other materials into space and to direct the potatoes into said collector owing to their greater resiliency, whereas the heavier and less resilient materials drop down between the delivery end of said final separator and the collector, and means for receiving potatoes and neighboring materials dug up therewith, including soil, turf, vines and heavier substances, such as rocks, partially separating the same and conveying them to a point above said final separator and then allowing the potatoes and some of the other materials to descend under the action of gravity on to said final separator, a partial classification taking place in said descent of the materials owing to the difference in the specific gravity and resiliency between the potatoes and other materials.

40. In apparatus of the class described, the combination of means for receiving and conveying potatoes and neighboring materials dug up therewith, including soil, turf, vines and heavier substances such as rocks, said means being constructed to effect a substantial separation of the vines from the potatoes and other substances and to deliver the vines at the rear end of the apparatus and to allow batches of potatoes and other materials at a predetermined point to drop under the action of gravity thereby effecting partial classification of the potatoes and other materials due to the difference in specific gravity and resiliency between the potatoes and other materials dropping therewith, and means for arresting the fall of said potatoes and other materials and directing the potatoes and heavier substances, such as rocks, toward a delivery point for the potatoes and rocks, said last described means being shaped and disposed so that when the potatoes leave its delivery end, owing to the resiliency of the potatoes, they are discharged a greater distance from said delivery end than the rocks to effect final classification of the potatoes and rocks.

41. In apparatus of the class described, the combination of a collector for potatoes, and mechanism for receiving potatoes and neighboring materials dug up therewith, including soil, turf, vines and heavier substances such as rocks, separating the potatoes from said neighboring materials and directing them into said collector, said mechanism comprising means for conveying the potatoes and neighboring materials and substantially separating the vines from the potatoes and other materials and discharging the vines at one point, and means for causing the potatoes and materials other than vines to drop at a predetermined point under gravity action thereby effecting partial classification owing to the differences in resiliency and specific gravity between the potatoes and other materials, and means for arresting the fall of said potatoes and other materials and directing the potatoes and heavier substances such as rocks toward said collector, the delivery end of said last described means being arranged at a distance from said collector so as to deliver the potatoes and heavier substances into space and to direct the potatoes into the collector because of the greater resiliency of the potatoes as compared with the heavier substances, whereas said heavier substances fall between the collector and delivery mechanism.

42. In apparatus of the class described, the combination of a collector for potatoes, means for receiving and partially classifying potatoes and neighboring materials dug up therewith, including soil, turf, vines and heavier substances, such as rocks, as they are allowed to fall through space under the action of gravity, and for dumping potatoes and some of the said materials, including rocks, that they may be again acted upon by gravity to effect a further separation thereof, and means for arresting the descent of said potatoes and other materials and directing the potatoes and rocks toward said collector and projecting them toward said collector, the said means being correlated and disposed relative to said collector, whereby owing to the greater resiliency of the potatoes than the rocks, the potatoes are directed into said collector, whereas the rocks fall at one side thereof.

43. In apparatus of the class described, the combination of a collector for potatoes, means for receiving and partially classifying potatoes and neighboring materials dug up therewith, including soil, turf, vines and heavier substances, such as rocks, and for dumping potatoes and some of the said materials, including rocks, that they may be acted upon by gravity to effect a separation thereof, and means for arresting the descent of said potatoes and rocks, directing them toward said collector and projecting them into space, the end of said last described means adjacent said collector being so disposed relative thereto that because of the greater resiliency of the potatoes than the rocks, the potatoes are caused to be projected into said collector whereas the rocks drop at one side thereof.

44. In a potato harvester, the combination with an endless traveling conveyer for potatoes and other materials dug up therewith including vines, said conveyer being made up of sections pivoted at one end, of means whereby the free end of each section in turn is separated from the adjacent section sufficiently to permit discharge of the potatoes while the vines are retained.

45. In a potato harvester, the combination of an endless traveling conveyer for potatoes and other materials dug up therewith including vines, and means whereby at a certain point of discharge spaces are opened through the conveyer large enough to permit the passage of the potatoes while the vines are retained.

46. In a potato harvester, the combination of a supporting frame, an endless traveling conveyer for potatoes and other materials dug up therewith including vines, means whereby at a certain point of discharge spaces are opened through the conveyer large enough to permit the passage of the potatoes while the vines are retained, a hopper at one side of the conveyer, means for conducting the potatoes from the point of discharge to the hopper, and a receiving device beneath the hopper.

47. In a potato harvester, the combination of an endless conveyer composed of sections adapted to carry on their tops the vines and coarse material dug up with the potatoes and having pockets or recesses at a lower level in which the potatoes accumulate, and means for discharging the potatoes from said pockets before reaching the end of the conveyer.

48. In a potato harvester, the combination of a frame, an endless conveyer thereon with points of support for carrying the vines and pockets below the level of said points of support in which the potatoes accumulate, and means for discharging the potatoes from said pockets before reaching the end of the conveyer.

49. In a potato harvester, the combination of a frame, an endless conveyer carried by said frame and made up of pivoted conveyer sections adapted to carry the vines on their tops, said sections having pockets at a lower level in which the potatoes accumulate, and means for dropping the ends of said sections and discharging said pockets before reaching the end of said conveyer.

50. In a potato harvester, a conveyer mechanism including an endless series of dumping sections adapted to receive potatoes, stones, vines and turf from a digging appliance, each said dumping section, when in position along its uppermost run to receive said potatoes, stones, vines and turf, having a portion arranged at an inclination to the horizontal to permit the potatoes to roll to the then lower end thereof, and means for causing the dumping of said sections at a predetermined point in their travel, whereby the potatoes are collected in said sections and delivered therefrom through said conveyer at said predetermined point and said vines are supported on top of the conveyer and discharged at one end thereof.

51. In a potato harvester, the combination of an endless carrier, a series of articulate sections connected therewith, and movable relative to said carrier, and a support arranged in a plane below and substantially parallel to the upper run of said carrier and operating to support said sections during movement therealong to form a series of receiving pockets for the potatoes.

52. In a potato harvester, the combination of an endless carrier, a series of articulate sections connected with, and movable relative to said carrier, and a support arranged in a plane below and substantially parallel to the upper run of said carrier and operating to support said sections during movement therealong to form a series of receiving pockets for the potatoes, the support terminating at a predetermined point and permitting discharge of the potatoes from said sections.

53. In a potato harvester, the combination of an endless conveyer comprising sections arranged to receive the potatoes and dump them before reaching the upper end of the upper run of said conveyer, and means for engaging and holding the vines above the sections of the conveyer to permit the collection of the potatoes therein.

54. In a potato harvester, the combination of an endless conveyer having dumping sections arranged to receive the potatoes and dump them between the ends of the upper run of the conveyer, the conveyer being provided with means for engaging and conveying the vines irrespective of the dumping of the potatoes.

55. In a potato harvester, the combination of an endless elevating conveyer having dumping sections arranged to receive the potatoes and dump them before reaching the upper end of the upper run of said conveyer and upwardly extending fingers for engaging and conveying vines over the upper end of said conveyer.

56. In a potato harvester, the combination of an endless elevating conveyer having dumping sections, means for effecting the dumping of the sections before they arrive at the head of the conveyer, and means for carrying vines over the head of the conveyer.

57. In a potato harvester, the combination of an endless conveyer composed of self-discharging sections adapted to carry on their tops the vines and coarse material and having pockets or recesses at a lower level in which potatoes accumulate, and means for preventing the discharge of said sections until they have reached a predetermined point.

58. In a potato harvester, the combination of a digging appliance for scooping up from the ground potatoes and neighboring materials including soil, vines, turfs and solid bodies such as rocks, means for receiving said potatoes and materials from the digging appliance and for separating from the potatoes part of the materials including the vines, and additional means utilizing the differences in the resiliency and specific gravity of the potatoes and the remaining materials for separating the latter from the potatoes.

59. In a potato harvester, the combination of a digging appliance for scooping up from the ground potatoes and neighboring materials including soil, turfs and solid bodies such as rocks, means for receiving the potatoes and materials from the digging appliance and for separating from the potatoes part of the materials including the loose soil, and additional means utilizing the differences in the resiliency and specific gravity of the potatoes and the remaining materials for separating from the potatoes the remaining materials including bodies of a size inseparable from the potatoes by screening.

60. In a potato harvester, the combination of a digging appliance for scooping up from the ground potatoes and neighboring materials including soil, vines, turfs and solid bodies such as rocks, a potato collector, means for receiving the potatoes and materials from the digging appliance and for separating from the potatoes part of the materials including the vines, and additional means utilizing the differences in the resiliency and specific gravity of the potatoes and the other materials for separating from the potatoes the remaining materials including bodies of a size inseparable from the potatoes by screening and for delivering the separated potatoes into the said collector.

61. In a potato harvester, the combination of a digging appliance for scooping up from the ground potatoes and neighboring materials including soil, vines, turfs and solid bodies such as rocks, a potato collector, means for receiving said potatoes and materials from the digging appliance and for separating from the potatoes part of the materials including the vines, and additional means utilizing the differences in the resiliency and specific gravity of the potatoes and the remaining materials to project the potatoes and remaining materials through space in different paths and cause the potatoes to enter the said collector and the said materials to fall at one side thereof.

62. In a potato harvester, the combination of a digging appliance for scooping up from the ground potatoes and neighboring materials including soil, vines, turfs and solid bodies such as rocks, a potato collector, means for receiving said potatoes and materials from the digging appliance and for separating from the potatoes part of the materials including the vines, and additional means comprising a plurality of conveyers one of which discharges the potatoes and the remaining materials upon the other conveyer so as to utilize the differences in the resiliency and specific gravity of the potatoes and the remaining materials for partially separating the same, the last named conveyer utilizing the said differences in resiliency and specific gravity to discharge the partially separated potatoes and materials in different paths so that the potatoes enter the collector while the said materials fall at one side thereof, 63. In a potato harvester, the combination of a digging appliance for scooping up from the ground potatoes and neighboring materials including soil, vines, turfs and solid bodies such as rocks, a potato collector, and mechanism receiving the potatoes and materials from the digging appliance and comprising means for separating and discharging the loose soil, means for separating and discharging the vines, and means utilizing the differences in the resiliency and specific gravity of the potatoes and remaining materials for separating from the potatoes the remaining materials including bodies of a size inseparable from the potatoes by screening and for delivering the separated potatoes into the said collector.

In testimony whereof I affix my signature, in the presence of two witnesses.

EDWARD P. KENDALL.

Witnesses:
  ALBERT HENDERSON,
  ALTON C. SMALL.

Copies of this patent may be obtained for five cents each, by addressing the "Commissioner of Patents, Washington, D. C."